United States Patent
Morfin et al.

(10) Patent No.: US 11,502,325 B2
(45) Date of Patent: Nov. 15, 2022

(54) BATTERY STACK ASSEMBLIES AND METHODS FOR REPLACING A BATTERY CELL

(71) Applicant: Toyota Motor Engineering & Manufacturing North America, Inc., Plano, TX (US)

(72) Inventors: Lincoln Morfin, Saline, MI (US); Jordan S. Guttrich, Commerce Township, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 249 days.

(21) Appl. No.: 16/721,252

(22) Filed: Dec. 19, 2019

(65) Prior Publication Data

US 2021/0194034 A1    Jun. 24, 2021

(51) Int. Cl.
*H01M 8/248* (2016.01)

(52) U.S. Cl.
CPC .................... *H01M 8/248* (2013.01)

(58) Field of Classification Search
CPC ............... H01M 50/20; H01M 8/248
See application file for complete search history.

(56) References Cited

U.S. PATENT DOCUMENTS

| | | | |
|---|---|---|---|
| 5,756,227 A * | 5/1998 | Suzuki | H01M 10/625 429/62 |
| 5,993,987 A | 11/1999 | Wozniczka et al. | |
| 8,465,881 B2 | 6/2013 | Ozgur | |
| 2008/0280194 A1 * | 11/2008 | Okada | H01M 50/20 429/99 |
| 2010/0279152 A1 * | 11/2010 | Payne | H01M 10/486 429/50 |
| 2011/0042117 A1 | 2/2011 | Doege et al. | |
| 2011/0086292 A1 * | 4/2011 | Ko | H01M 8/248 429/507 |
| 2012/0156537 A1 | 6/2012 | Meintschel et al. | |
| 2012/0315519 A1 * | 12/2012 | Jin | H01M 10/613 429/99 |
| 2014/0106254 A1 * | 4/2014 | Yamano | H01M 8/2483 429/465 |
| 2014/0127551 A1 | 5/2014 | Kim | |

(Continued)

FOREIGN PATENT DOCUMENTS

| | | |
|---|---|---|
| DE | 102015222171 A1 | 5/2017 |
| WO | 2013146561 A1 | 10/2013 |
| WO | 2019166335 A1 | 9/2019 |

*Primary Examiner* — Imran Akram
(74) *Attorney, Agent, or Firm* — Dinsmore & Shohl LLP

(57) ABSTRACT

In one embodiment, a battery stack assembly includes a plurality of sleeves, a plurality of battery cells, and one or more retention bands. The plurality of sleeves is arranged in a stack along a common plane, each of the plurality of sleeves including a slot. The plurality of battery cells are positioned within the plurality of sleeves such that at least a portion of each battery cell is accessible when positioned within a dedicated sleeve. The one or more retention bands extend through each of the slots formed in the plurality of sleeves, wherein the one or more retention bands facilitate application of compression across the stack, and release of compression allows a chosen cell to be withdrawn from the dedicated sleeve.

16 Claims, 5 Drawing Sheets

(56) References Cited

U.S. PATENT DOCUMENTS

| | | | |
|---|---|---|---|
| 2014/0363720 A1* | 12/2014 | Ackermann | H01M 10/6557 29/623.1 |
| 2015/0357616 A1* | 12/2015 | Morisaku | H01M 50/20 429/96 |
| 2015/0372267 A1 | 12/2015 | Keller et al. | |
| 2016/0099490 A1* | 4/2016 | Larsson | H01M 10/6557 429/120 |
| 2018/0151906 A1* | 5/2018 | Grandjean | H01M 8/248 |
| 2019/0115574 A1* | 4/2019 | Marjanovic | H01M 50/20 |

* cited by examiner

BATTERY STACK ASSEMBLIES AND METHODS FOR REPLACING A BATTERY CELL

TECHNICAL FIELD

The present specification generally relates to battery stack assemblies and methods and, more specifically, battery stack assemblies and methods for replacing a battery cell.

BACKGROUND

Hybrid/electric vehicles may include battery packs that include a stack of battery cells. During operation, the battery stack is kept under compression by non-adjustable structure, for example, riveted retention bands. However, if an individual cell goes bad (e.g., dies, malfunctions, or the like), it is difficult to remove an individual cell from the stack to replace the bad cell. Accordingly, often when a single cell goes bad, the entire battery back may be replaced as opposed to just the bad cell.

Accordingly, a need exists for alternative battery stack assemblies and methods for replacing a battery cell that provide improved ease of replacement of individual cells.

SUMMARY

In one embodiment, a battery stack assembly includes a plurality of sleeves, a plurality of battery cells, and one or more retention bands. The plurality of sleeves is arranged in a stack along a common plane, each of the plurality of sleeves including a slot. The plurality of battery cells are positioned within the plurality of sleeves such that at least a portion of each battery cell is accessible when positioned within a dedicated sleeve. The one or more retention bands extend through each of the slots formed in the plurality of sleeves, wherein the one or more retention bands facilitate application of compression across the stack, and release of compression allows a chosen cell to be withdrawn from the dedicated sleeve.

In another embodiment, a method for replacing a battery cell within a battery stack is disclosed. The battery stack includes a plurality of sleeves arranged in a stack along a common plane, each of the plurality of sleeves including a slot, a plurality of battery cells positioned within the plurality of sleeves such that at least a portion of each battery cell is accessible when positioned within a dedicated sleeve, and one or more retention bands extending through each of the slots formed in the plurality of sleeves, wherein the one or more retention bands facilitate application of compression across the stack. The method includes relieving compression within the stack, withdrawing a bad battery cell from the dedicated sleeve, inserting a replacement cell into the dedicated sleeve, and re-applying compression to the stack by compressing the stack along the one or more retention bands.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
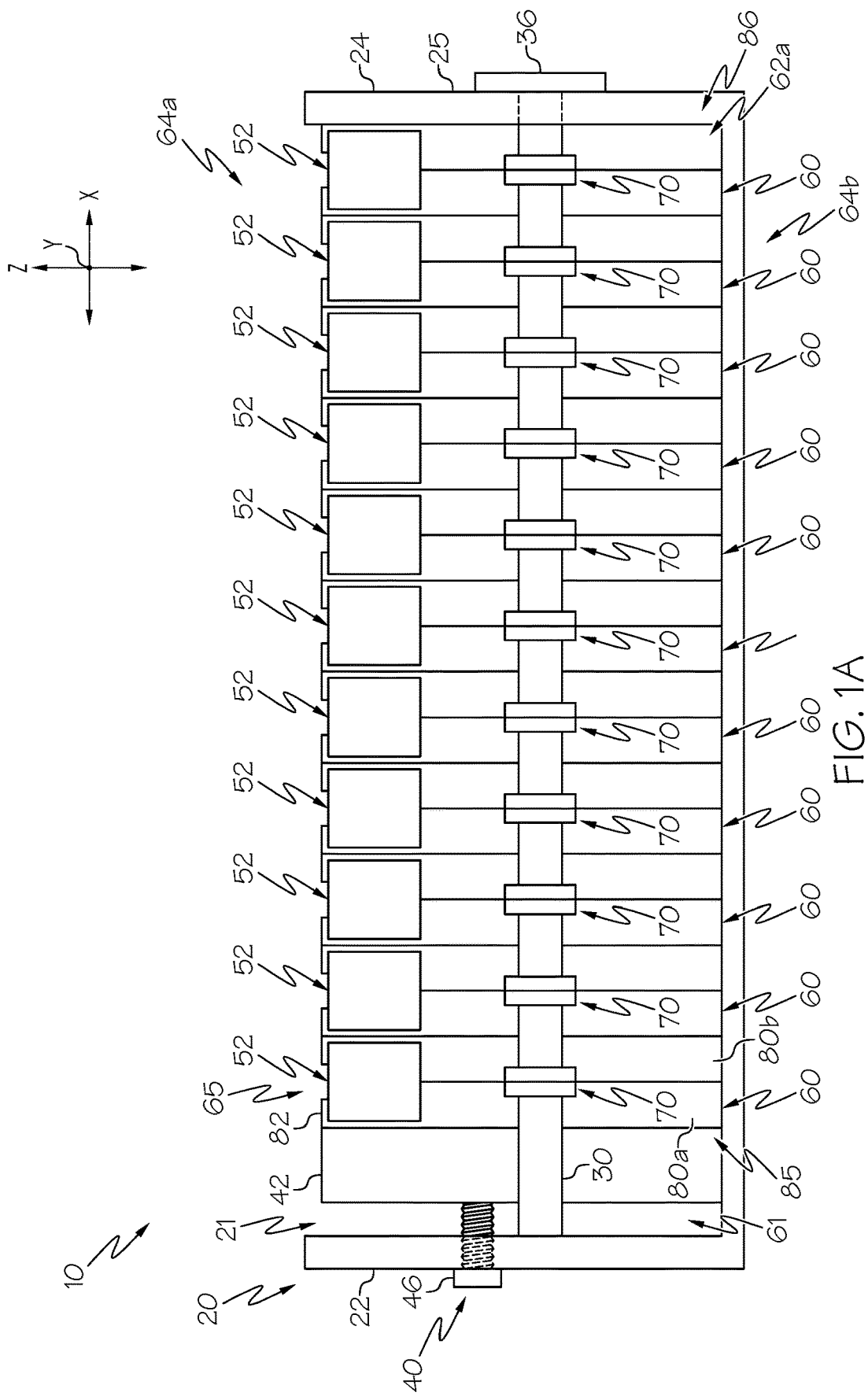
FIG. 1A schematically depicts a side view of a battery stack assembly, according to one or more embodiments shown and described herein.
Figure 1B:
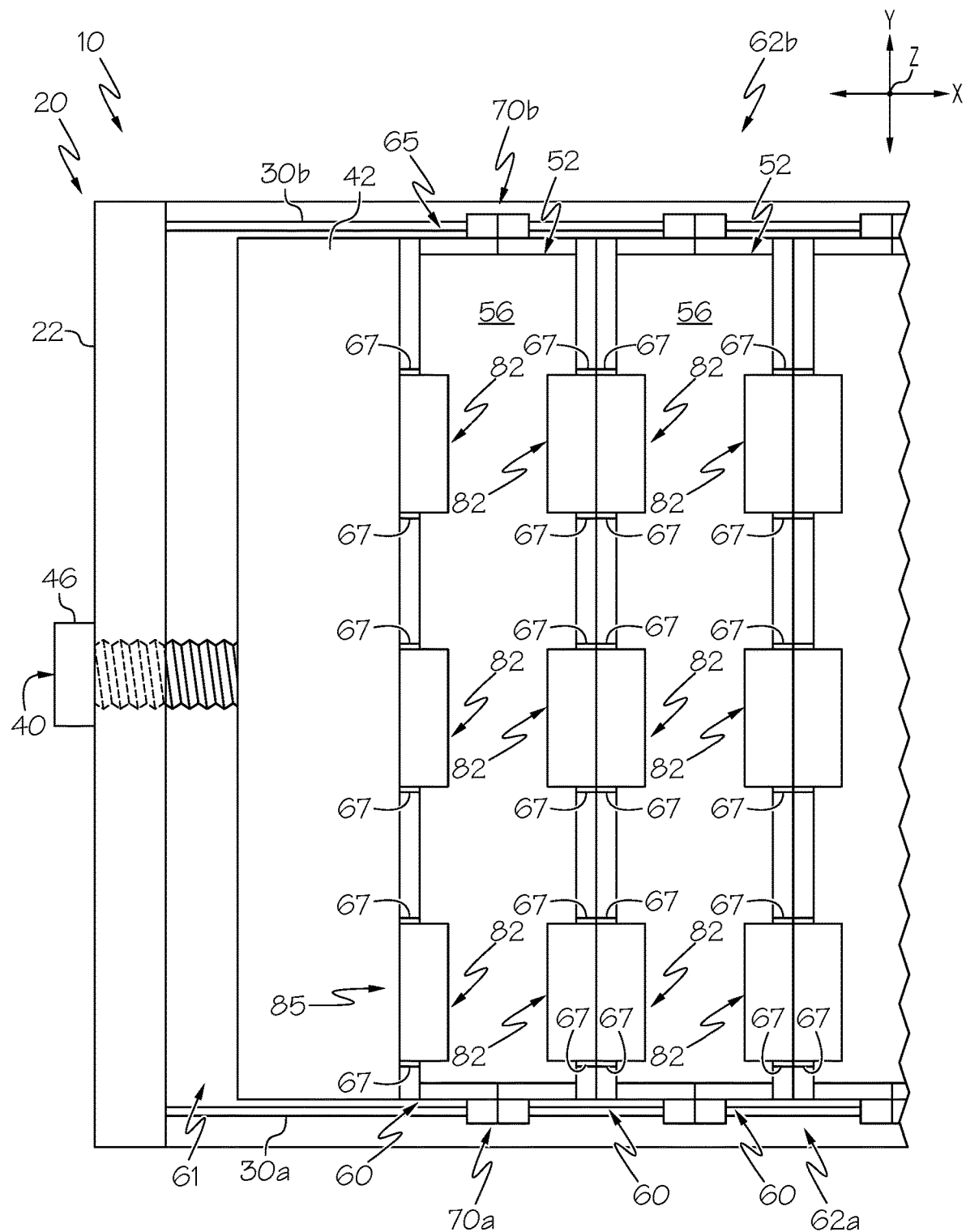
FIG. 1B illustrates a partial top view of the battery stack assembly of FIG. 1A, according to one or more embodiments shown and described herein.

Referring generally to FIGS. 1A and 1B a battery stack assembly is schematically illustrated. As will be described in greater detail herein, battery stack assemblies according the present disclosure include a plurality of sleeves, a plurality of battery cells, and one or more retention bands. The plurality of battery cells are positioned within the plurality of sleeves such that at least a portion of each battery cell is accessible when positioned within a dedicated sleeve. The one or more retention bands extend through a plurality of slots formed in the plurality of sleeves, wherein the one or more retention bands facilitate application of compression across the stack. Release of compression allows a chosen cell to be withdrawn from the dedicated sleeve and replaced. Compression may then be re-applied across the stack. Accordingly, replacement of a single battery cell, or more, may be easily achieved leading to longer battery stack life.

Battery stack assemblies as described herein may be utilized as electric/hybrid vehicle batteries. However, other applications are contemplated and possible, e.g., medical electronics, aviation applications (both hybrid and electric), solar PV energy, computers, etc.).

Referring now to FIG. 1A, a side view of a battery stack assembly 10 is schematically illustrated. The battery stack assembly 10 generally includes a plurality of sleeves 60, a plurality of battery cells 52, and one or more retention bands 30. The plurality of sleeves 60 along with the plurality of battery cells 52 disposed therein, are arranged in a stack 61 extending along a common plane (e.g., parallel to the X/Y plane of the depicted coordinate axes). The battery stack assembly 10 may further include a housing 20, an adjustment mechanism 40, and a stabilizing block 36. These components will be described in greater detail below.

As noted above, the plurality of sleeves 60 may be arranged in a stack 61 along a common plane (e.g., parallel to the X/Y plane of the depicted coordinate axes). Each of the sleeves 60 may be substantially identical to one another and arranged in the same orientation. With reference to both FIGS. 1A and 1B (illustrating a side view and a top view, respectively, of the battery stack assembly 10), the stack 61 may generally have a quadrilateral shape having a first longitudinal side 62a, a second longitudinal side 62b opposite the first longitudinal side 62a, a top side 64a, and a bottom side 64b opposite the top side 64a.

Figure 2:
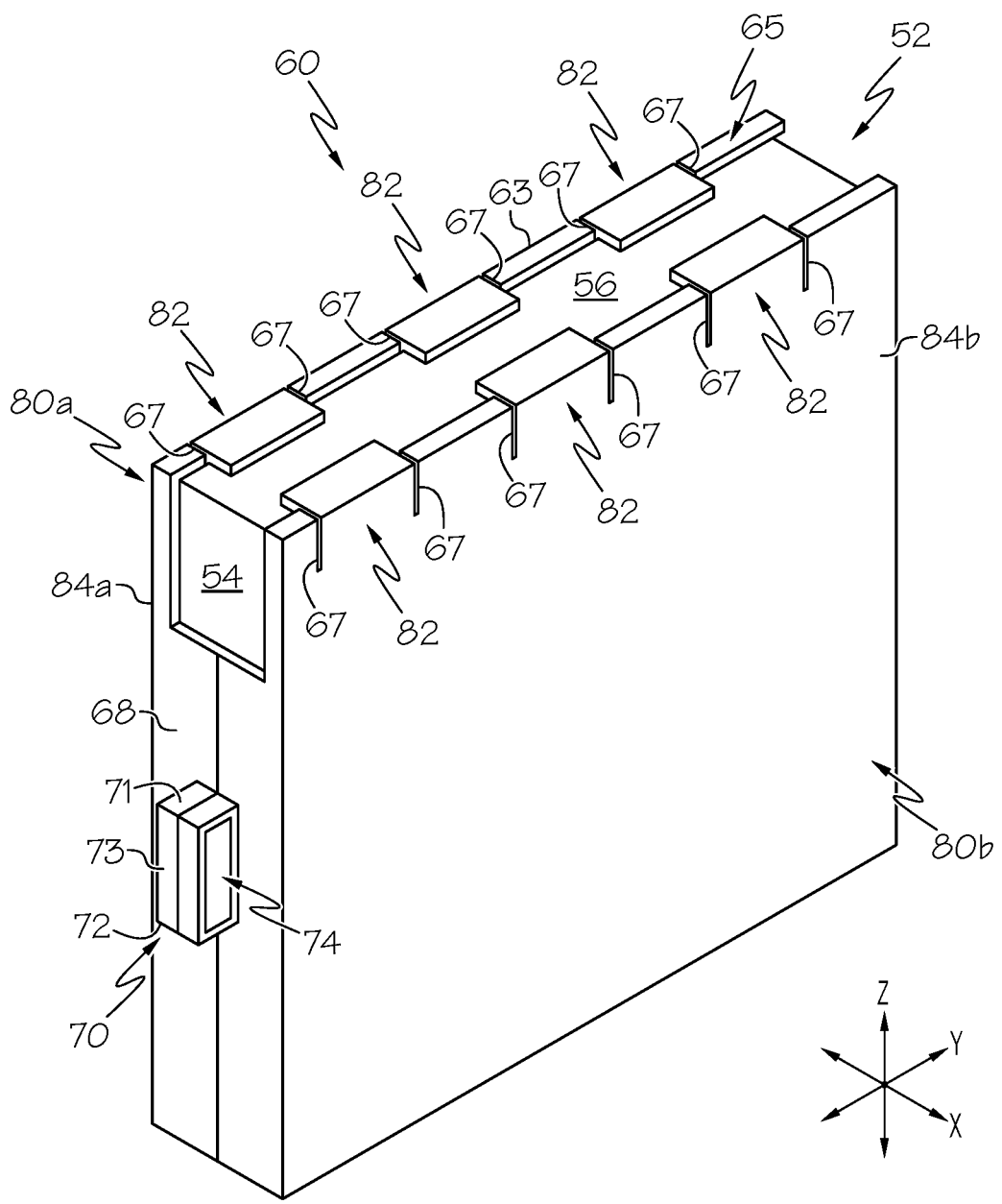
FIG. 2 is an isometric view of a battery cell within a sleeve in isolation from the battery stack assembly of FIGS. 1A and 1B, according to one or more embodiments shown and described herein.

An individual sleeve 60 housing a battery cell 52 is illustrated in FIG. 2 in isolation from the battery stack assembly 10 shown in FIGS. 1A and 1B. The sleeve 60 may include any device configured to hold a battery cell 52 within the stack 61. The sleeve 60 may be made from any material including plastic, composite, or the like. The sleeve 60 may include a front portion 80*a* configured to be arranged on one side of the battery cell 52 and a back portion 80*b* configured to be arranged on the opposite side of the battery cell 52. The front portion 80*a* may include a front wall 84*a* that extends along a side surface 54 of the battery cell 52 and the back portion 80*b* may include a back wall 84*a* configured to extend along an opposite side surface 54 of the battery cell 52 from the front wall 84*a*. The front portion 80*a* and the back portion 80*b* may be separable from one another into discrete components (e.g., see also FIG. 4) and spaced apart from one another. For example, the front portion 80*a* and the back portion 80*b* may couple together through a snap fitting or similar mating structure. The front portion 80*a* and the back portion 80*b* may be arranged to fit closely with the battery cell 52 such that the front portion 80*a* and the back portion 80*b* are in contact with a front and back of the battery cell 52.

Each of the front portion 80*a* and the back portion 80*b* when assembled together and provide a partial sidewall 68 that extends along at least a portion of a side surface 54 of the battery cell 52. The partial sidewall 68 may be in contact with the side surface 54 of the battery cell 52 or spaced therefrom. Though not shown, a similar partial sidewall may extend along the opposite side surface of the battery cell 52 from that illustrated.

Still referring to FIG. 2, formed in each sleeve 60 is a slot 74 for receiving the one or more retention bands 30. For example, coupled to the partial sidewall 68 of the sleeve 60 may be a slot housing 70 defining the slot 74 extending therethrough. For example, the slot housing 70 may include a top wall 71, a bottom wall 72, and a sidewall 73, which connects the top wall 71 and the bottom wall 72. The top wall 71 and the bottom wall 72 may be mounted to the partial sidewall 68 such that the slot 74 is formed between the partial sidewall 68 and the sidewall 73 of the slot housing 70. The slot housing 70 may be coupled to the front portion 80*a*, the back portion 80*b*, or both and may be separable into discrete portions coupled to the front portion 80*a* and the back portion 80*b*, respectfully. The slot 74 may be shaped to receive a retention band therethrough. As illustrated in FIG. 1B, the sleeve 60 may include a slot housing 70*a*, 70*b* on opposing sides of each sleeve 60, such a plurality of slots are formed in the plurality of sleeves 60. This may allow a retention band 30 to extend along both longitudinal sides 62*a*, 62*b* of the stack 61.

Referring still to FIG. 2, each sleeve 60 defines an opening 65 through which the battery cell 52 may be accessible. That is, the battery cell 52 may be withdrawable/insertable through the opening 65 (see also FIG. 4). In the illustrated embodiment, the opening 65 may begin above the partial sidewall 68 and extend around a top surface 56 of the battery cell 52. Stated another way, above the partial sidewall 68, the front portion 80*a* and the back portion 80*b* may not contact one another.

In some embodiments around the opening 65, particularly along a top edge 63 of the sleeve 60*b* may be one or more teeth 82 that extend over the top surface 56 of the battery cell 52. The one or more teeth 82 may only extend over the top surface of the battery cell 52 a predetermined distance (e.g., less than about 3 mm, less than about 2 mm, less than about 1.5 mm). The one or more teeth 82 may aid in maintaining the battery cell 52 within the sleeve 60 during compression or typical use of the battery stack assembly 10.

On either side of each of the one or more teeth 82 may be a cutout 67 that extends vertically (e.g., in the Z-direction of the depicted coordinate axes) through the front and/or back walls 84*a*, 84*b* of front portion 80*a* and the back portion 80*b*, respectively. The cutouts 67 may provide a degree of flexibility to the one or more teeth 82 such that the one or more teeth 82 may be pushed or bent out of the way of the top surface 56 of the battery cell 52 to allow for the battery cell 52 to be withdrawn from the sleeve 60*b* without separating the sleeve 60*b* into its discrete front and back portions 80*a*, 80*b*. It is noted that while the one or more teeth 82 are illustrated extending along the top edge 63 from both the front portion 80*a* and the back portion 80*b*, in some embodiments, the one or more teeth 82 may extend only from one of the front portion 80*a* or the back portion 80*b*.

Referring again to FIGS. 1A and 1B, the plurality of battery cells 52 may include any type of battery cells 52, and, in particular, may include rectangular or square battery cells 52. The plurality of battery cells 52 may include, but are not limited to lithium ion battery cells, NiMH battery cells, or the like. Though not shown, the plurality of battery cells 52 may comprise connectors, which are accessible through the opening 65 or a separate dedicated opening, to allow for electrically coupling the plurality of battery cells 52 to one another.

Referring again to FIGS. 1A and 1B, the one or more retention bands 30 are illustrated as extending through the plurality of slot housings 70 of the plurality of sleeves 60. The plurality of sleeves 60 may be slidable along the one or more retention bands 30 for, for example, release and/or application of compressive force. The one or more retention bands 30 may include, but are not limited to, flat bands, round bands, or bolts. The one or more retention bands 30 may be metal, plastic, composite, or like. The one or more retention bands 30 may extend through the plurality of slot housings 70 on either side of the opening 65 without interfering the ability of the battery cell 52 to be retrieved through the opening 65. For example, the one or more retention bands 30 may be arranged along the first longitudinal side 62*a*, the second longitudinal side 62*b*, or both. Accordingly, in some embodiments, a first retention band 30*a* may extend along a first longitudinal side 62*a* of the stack 61 and a second retention band 30*b* may extend along a second longitudinal side 62*b* of the stack 61 opposite the first longitudinal side 62*a*, as illustrated in FIG. 1B. As will be described in greater detail below, the one or more retention bands 30 facilitate application of compression on the battery cells 52 on the stack 61 by maintaining alignment of the stack 61 along a common axis (e.g., the X-axis of the depicted coordinate axes) during release and application of compression.

The housing 20 may include any structure configured to house the stack 61 of sleeves 60 and battery cells 52. The housing 20 may be any material, for example, plastic, metal, composite, etc. The housing 20 includes a first end wall 22 and a second end wall 24 arranged opposite the first end wall 22. Side, top, and/or bottom walls may extend between the first and second end walls 22, 24 to provide an enclosure 21 within which the stack 61 may be positioned. In embodiments, the housing 20 may include a removable lid (not shown) to provide selective access to the enclosure 21 and the stack 61 positioned within the enclosure 21. When the stack 61 is positioned within the housing 20 first end wall 22 may be arranged at a first end 85 of the stack 61 and the second end wall 24 may arranged at a second end 86 of the stack 61.

In some embodiments, and with reference to FIG. 1A, the one or more retention bands 30 may be attached to the first end wall 22 through any conventional means (e.g., welding, brazing, adhesively coupling, mechanical couplings, or the like). In some embodiments, the one or more retention bands 30 may not be attached to the first end wall 22 but may extend through, abut, or be positioned proximate to the first end wall 22. The one or more retention bands 30 may extend from the first end wall 22 through the second end wall 24 of the housing 20 and be coupled to a stabilizing block 36. The stabilizing block 36, for example, may be a metal plate that extends over a portion of an outer surface 25 of the second end wall 24. The stabilizing block 36 may be welded to the one or more retention bands 30. During release or application of compression the stabilizing block 36 may keep the retention bands 30 in alignment (e.g., along the X-axis of the depicted coordinate axes). The stabilizing block 36 may be any size and or shape (e.g., e.g., 2 in. by 2 in. square, a 1 in. by 1 in. square, a 2 in. diameter circle, a 1 in diameter circle, etc.). In some embodiments, each of the one or more retention bands 30 may be coupled to a separate stabilizing block 36.

In some embodiments and as shown in FIG. 1A, to adjust compression within the stack 61 an adjustment mechanism 40 may be provided. The adjustment mechanism 40 may include any mechanical device operable to apply compression to the stack 61. For example, the adjustment mechanism 40 may include an adjustable shim 42 arranged between a first end 85 of the stack 61 and the first end wall 22 of the housing 20. The adjustable shim 42 may be a block of material such as, for example, metal, plastic, composite, etc.

The adjustable shim 42 may be may be adjustably distanced from the first end wall 22 of the housing 20 to compress the stack 61 or to release stack compression. For example, the adjustable shim 42 may be coupled to an actuator that engages the adjustable shim 42 to move the adjustable shim 42 along the X-axis of the depicted coordinate axes. For example, the actuator may be fastener 46 that engages the adjustable shim 42 to adjust the placement of the adjustable shim 42 within the housing 20. For example, the fastener 46 may extend through the first end wall 22 of the housing 20 to be engaged with the adjustable shim 42, such as by abutting the adjustable shim 42. Rotation of the fastener 46 in either a clockwise direction or a counterclockwise direction may move the adjustable shim 42 toward the stack 61 or away from the stack 61. When the adjustable shim 42 is moved toward the first end 85 of the stack 61, compression may be applied to the stack 61. When the adjustable shim 42 is withdrawn from the first end 85 of the stack 61, compression may be released. While only one fastener is depicted, any number of fasteners may be included to move the adjustable shim 42 toward or away from the stack 61 without departing from the scope of the present disclosure. Additionally, other actuators are contemplated and possible such as, for example, electric linear actuators, hydraulic linear actuators, pneumatic linear actuators, or other manual actuation devices. It is noted that while the one or more retention bands 30 are illustrated as passing outside of the adjustable shim 42, in some embodiments, the adjustable shim 42 may be slidably mounted on the one or more retention bands 30, such that the one or more retention bands 30 pass through the adjustable shim 42.

Figure 3:
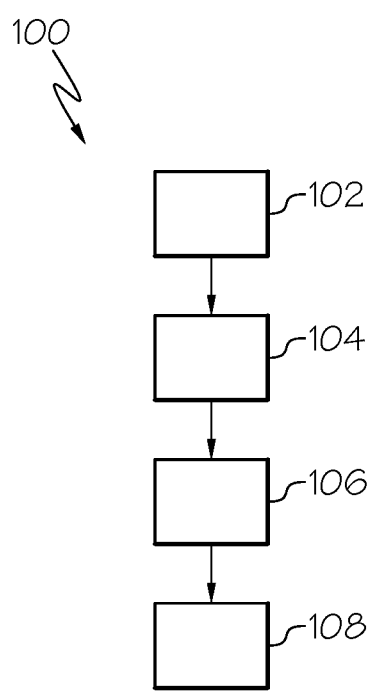
FIG. 3 depicts a flowchart illustrating a method for replacing a battery cell within the battery stack of FIGS. 1A and 1B, according to one or more embodiments shown and described herein.
Figure 4:
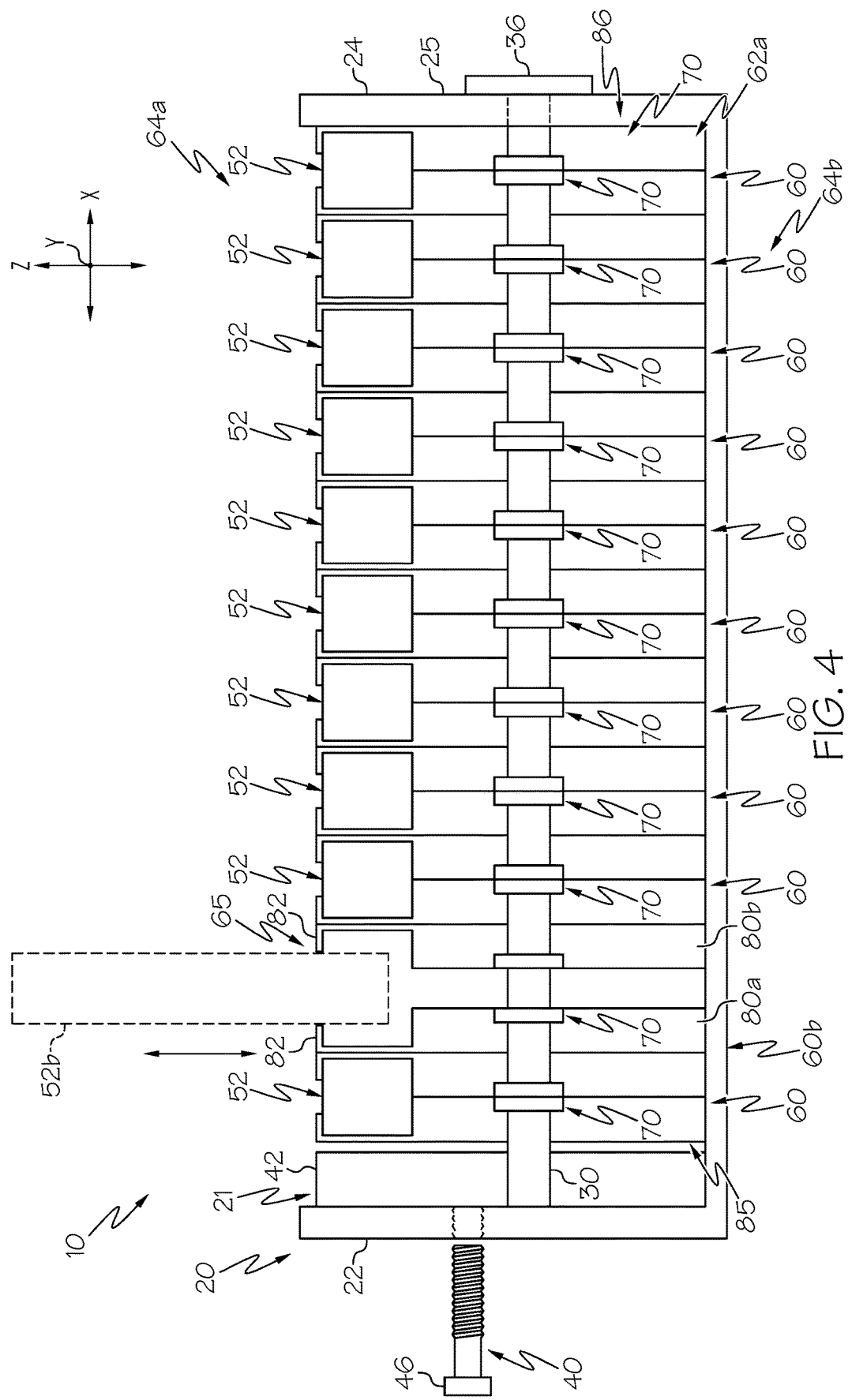
FIG. 4 depicts a battery cell being replaced with in the battery stack assembly of FIGS. 1A and 1B, according to one or more embodiments shown and described herein.

FIG. 3 depicts a method 100 for replacing a battery cell 52 within the battery stack assembly 10, as described above. It is noted that though a finite number of steps are illustrated, a greater or fewer number of steps, in any order, may be included without departing from the scope of the present disclosure. Step 102 includes relieving compression within the stack 61. For example, adjusting a position of the adjustable shim 42 in a direction away from the first end of the stack 61 may release compression and allow the plurality of sleeves 60 and the plurality of battery cells 52 to slide along the one or more retention bands 30. Step 104 includes withdrawing a bad battery cell 52b from a dedicated sleeve 60. For example, and with reference to FIG. 4, battery cell 52b may be bad (e.g., malfunctioning, dead, etc.) and in need of replacement. Once compression is released in step 102, the plurality of sleeves 60 may be moved along the one or more retention bands 30 to allow for better access to battery cell 52b within sleeve 60b. In some embodiments, and as illustrated in FIG. 4, the sleeve 60b may be separated into its discrete front and back portions 80a, 80b to allow for withdrawal of the battery cell 52b (e.g., in the Z direction of the depicted coordinate axes). In some embodiments, instead of separating the sleeve 60b into discrete components, the one or more teeth 82 may be pushed out of the way so that the battery cell 52b can be withdrawn without separation of the sleeve 60b into discrete components.

In embodiments where the sleeve 60b is separated into its discrete front and back portions 80a, 80b, the front and back portions 80a, 80b may be moveable between an engaged position, such as illustrated in FIG. 1A and a disengaged position, such as illustrated in FIG. 4. In the engaged position the front and back portions 80a, 80b are in contact. In some embodiments, the front and back portions 80a, 80b may not be in contact with one another, but instead, in the engaged position the teeth 82 of the front portion 80a and the back portion 80b may be spaced such that a distance between the teeth 82 of the front and back portions are less the a widthwise dimension (i.e., taken in the X direction of the depicted coordinate axes) of the battery cell 52. That is the teeth 82 of the front portion 80a and the back portion 80b overlap the top surface 56 of the battery to prevent the battery cell 52b from being displaced in the vertical direction. In a disengaged position, at least one of the front portion 80a and the back portion 80b is slid along the one or more retention bands supported within the slot 74 of the slot housing 70, to space the front portion 80a and the back portion 80b such that a distance between the teeth 82 of the front portion and the back portion is greater that the widthwise dimension of the battery cell 52 to allow that battery cell to be displaced in the vertical direction, as illustrated in FIG. 4.

At step 106, a replacement cell may be inserted into the now empty sleeve 60b. Upon reinsertion of the replacement cell, step 108 includes re-applying compression to the stack 61 by compressing the stack 61 along the one or more retention bands 30. For example, the adjustable shim 42 may be moved toward the first end of the stack 61 and pushed forward until a desired compression within the stack 61 is achieved. Applying compression to the stack 61 may move the front portion 80a and the back portion 80b back to the engaged position, such as illustrated in FIG. 1A, wherein the distance between the teeth 82 of the front and back portions 80a, 80b is again less the a widthwise dimension (i.e., taken in the X direction of the depicted coordinate axes) of the battery cell 52. Any of the cells may be replaced in a similar manner. For example, multiple battery cells may be replaced prior to re-application of compression.

In should now be understood that embodiments as provided herein are directed to a battery stack assembly and methods for replacing a battery cell within a battery stack assembly. Battery stack assemblies according the present disclosure include a plurality of sleeves, a plurality of battery cells, and one or more retention bands. The plurality of battery cells are positioned within the plurality of sleeves such that at least a portion of each battery cell is accessible when positioned within a dedicated sleeve. The one or more retention bands extend through a plurality of slots formed in the plurality of sleeves, wherein the one or more retention bands facilitate application of compression across the stack, and release of compression allows a chosen cell to be withdrawn from the dedicated sleeve. After the chosen cell is withdrawn, it may be replaced with a replacement cell. Compression may then be re-applied across the stack. Accordingly, a battery cell may be easily replaced and the battery stack assembly placed back in service, without disposing of the entire battery stack assembly.

It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery stack assembly comprising:
   a plurality of sleeves arranged in a stack along a common plane, each of the plurality of sleeves including a slot and defining an opening;
   each battery cell of a plurality of battery cells positioned within a sleeve of the plurality of sleeves such that at least a portion of the each battery cell is accessible via the opening when positioned within a dedicated sleeve; and
   one or more retention bands extending through each of the slots formed in the plurality of sleeves, wherein the one or more retention bands facilitate application of compression across the stack, and release of compression allows a chosen cell to be withdrawn from the dedicated sleeve,
   wherein each of the plurality of sleeves comprises:
   a front portion slidably coupled to the one or more retention bands;
   a back portion slidably coupled to the one or more retention bands, wherein the front portion is slidable relative to the back portion upon the release of compression to allow the chosen cell to be removed; and
   at least one tooth that extends into the opening, the at least one tooth configured to inhibit withdrawal of the battery cell positioned within a respective sleeve when the compression is applied.

2. The battery stack assembly of claim 1, further comprises a housing comprising a first end wall arranged at a first end of the stack and a second end wall arranged at a second end of the stack.

3. The battery stack assembly of claim 2, wherein the one or more retention bands extend through the second end wall and couple to a stabilizing block positioned on an outer surface of the second end wall.

4. The battery stack assembly of claim 2, further comprising an adjustable shim arranged between the first end of the stack and the first end wall of the housing, wherein the adjustable shim is configured to be adjustably distanced from the first end wall of the housing to compress the stack.

5. The battery stack assembly of claim 1, wherein the one or more retention bands comprise a first retention band extending along a first longitudinal side of the stack and a second retention band extending along a second longitudinal side of the stack opposite the first longitudinal side.

6. The battery stack assembly of claim 1, wherein the stack of the plurality of sleeves defines a first longitudinal side, a second longitudinal side opposite the first longitudinal side, a top side, and a bottom side opposite the top side, wherein:
   the one or more retention bands are arranged along the first longitudinal side, the second longitudinal side, or both.

7. The battery stack assembly of claim 6, wherein the plurality of sleeves further comprises a plurality of teeth arranged around the opening that extends over a top surface of the battery cell.

8. The battery stack assembly of claim 1, wherein the opening is expandable when the compression is released.

9. The battery stack assembly of claim 1, wherein at least one of the front portion and the back portion includes the at least one tooth that extends inwardly towards the opening.

10. A method for replacing a battery cell within a battery stack comprising a plurality of sleeves arranged in a stack along a common plane, each of the plurality of sleeves including a slot and defining an opening, each battery cell of a plurality of battery cells positioned within a sleeve of the plurality of sleeves such that at least a portion of the each battery cell is accessible via the opening when positioned within a dedicated sleeve, and one or more retention bands extending through each of the slots formed in the plurality of sleeves, wherein the one or more retention bands facilitate application of compression across the stack, wherein each sleeve of the plurality of sleeves comprises a front portion slidably coupled to the one or more retention bands, a back portion slidably coupled to the one or more retention bands, wherein the front portion is slidable relative to the back portion upon the release of compression to allow the chosen cell to be removed, and at least one tooth that extends into the opening, the at least one tooth configured to inhibit withdrawal of the battery cell positioned within a respective sleeve when the compression is applied, the method comprising:
   relieving compression within the stack;
   withdrawing a bad battery cell from the dedicated sleeve;
   inserting a replacement cell into the dedicated sleeve; and
   re-applying compression to the stack by compressing the stack along the one or more retention bands.

11. The method of claim 10, wherein:
   the battery stack further comprises:
   a housing comprising a first end wall arranged at a first end of the stack and a second end wall arranged at a second end of the stack; and
   an adjustable shim arranged between the first end of the stack and the first end wall of the housing, wherein the adjustable shim is configured to be adjustably distanced from the first end wall of the housing to compress the stack; and relieving compression within the stack comprises adjusting a position of the adjustable shim away from the first end of the stack.

12. The method of claim 11, wherein re-applying compression to the stack by compressing the stack along the one or more retention bands comprises adjusting the position of the adjustable shim toward the first end of the stack so as to slide the plurality of sleeves toward one another until a desired compression is achieved.

13. The method of claim 11, wherein the one or more retention bands extend through the second end wall and couple to a stabilizing block positioned on an outer surface of the first end wall.

14. The method of claim 10, wherein the stack of the plurality of sleeves defines a first longitudinal side, a second longitudinal side opposite the first longitudinal side, a top side, and a bottom side opposite that top side, wherein:
the one or more retention bands are arranged along the first longitudinal side, the second longitudinal side, or both.

15. The method of claim 14, wherein the plurality of sleeves further comprises a plurality of teeth arranged around the opening that extends over a top surface of the battery cell.

16. The method of claim 9, wherein the one or more retention bands comprise a first retention band extending along a first longitudinal side of the stack and a second retention band extending along a second longitudinal side of the stack opposite the first longitudinal side.

\* \* \* \* \*

UNITED STATES PATENT AND TRADEMARK OFFICE
CERTIFICATE OF CORRECTION

| | |
|---|---|
| PATENT NO. | : 11,502,325 B2 |
| APPLICATION NO. | : 16/721252 |
| DATED | : November 15, 2022 |
| INVENTOR(S) | : Lincoln Morfin and Jordan S. Guttrich |

It is certified that error appears in the above-identified patent and that said Letters Patent is hereby corrected as shown below:

In the Specification

In Column 5, Line(s) 35, delete "may be may be" and insert --may be--, therefor.

In Column 6, Line(s) 36, before "a widthwise", delete "the" and insert --than--, therefor.

In Column 6, Line(s) 46, after "greater", delete "that" and insert --than--, therefor.

In Column 6, Line(s) 61, before "a widthwise", delete "the" and insert --than--, therefor.

In Column 7, Line(s) 2, after "according" insert --to--.

Signed and Sealed this
Thirty-first Day of January, 2023

Katherine Kelly Vidal
*Director of the United States Patent and Trademark Office*